(12) United States Patent
Tabuchi

(10) Patent No.: US 8,199,206 B2
(45) Date of Patent: Jun. 12, 2012

(54) IMAGE STABILIZATION CONTROL CIRCUIT

(75) Inventor: Yoshihisa Tabuchi, Anpachi-gun (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 527 days.

(21) Appl. No.: 12/314,988

(22) Filed: Dec. 19, 2008

(65) Prior Publication Data
US 2009/0160948 A1    Jun. 25, 2009

(30) Foreign Application Priority Data
Dec. 25, 2007    (JP) .................................. 2007-331837

(51) Int. Cl.
*H04N 5/228* (2006.01)
(52) U.S. Cl. ............. 348/208.99; 348/208.2; 348/208.4; 348/208.7; 348/208.5
(58) Field of Classification Search .................. None
See application file for complete search history.

(56) References Cited

U.S. PATENT DOCUMENTS

| | | | | |
|---|---|---|---|---|
| 7,760,448 B2 * | 7/2010 | Nagata et al. | ................ | 359/814 |
| 8,089,517 B2 * | 1/2012 | Nagata et al. | ............. | 348/208.2 |
| 2005/0201741 A1 | 9/2005 | Moriya | | |
| 2005/0254805 A1 * | 11/2005 | Moriya et al. | .................. | 396/53 |
| 2007/0166021 A1 * | 7/2007 | Yamazaki | ....................... | 396/55 |
| 2008/0055421 A1 * | 3/2008 | Kimura | .................... | 348/208.99 |

FOREIGN PATENT DOCUMENTS
JP    A-10-213832    8/1998

OTHER PUBLICATIONS

Office Action dated Jul. 5, 2010 issued in Chinese Patent Application No. 200810188612.2 (w/ translation).

* cited by examiner

*Primary Examiner* — David Ometz
*Assistant Examiner* — Angel L Garces-Rivera
(74) *Attorney, Agent, or Firm* — Oliff & Berridge, PLC

(57) ABSTRACT

In an image stabilization control circuit for an image capturing device, a gyro-equalizer (24) is used to integrate an angular velocity signal corresponding to vibration, and determine a required magnitude of lens displacement. The gyro-equalizer (24) integrates the angular velocity signal from a gyro-sensor (12) using an integration circuit (46) (LPF), and converts the signal into an angular signal. A direct current component of the angular signal is removed using a centering circuit (50) (HPF). The LPF and HPF can produce an insufficient phase delay in a low-band side of a target compensation region. A phase lag compensation circuit (48) comprising a low-boost filter compensates for the insufficient phase delay, and brings the phase delay of the angular signal with respect to the angular velocity signal close to 90° in an integration process.

6 Claims, 4 Drawing Sheets

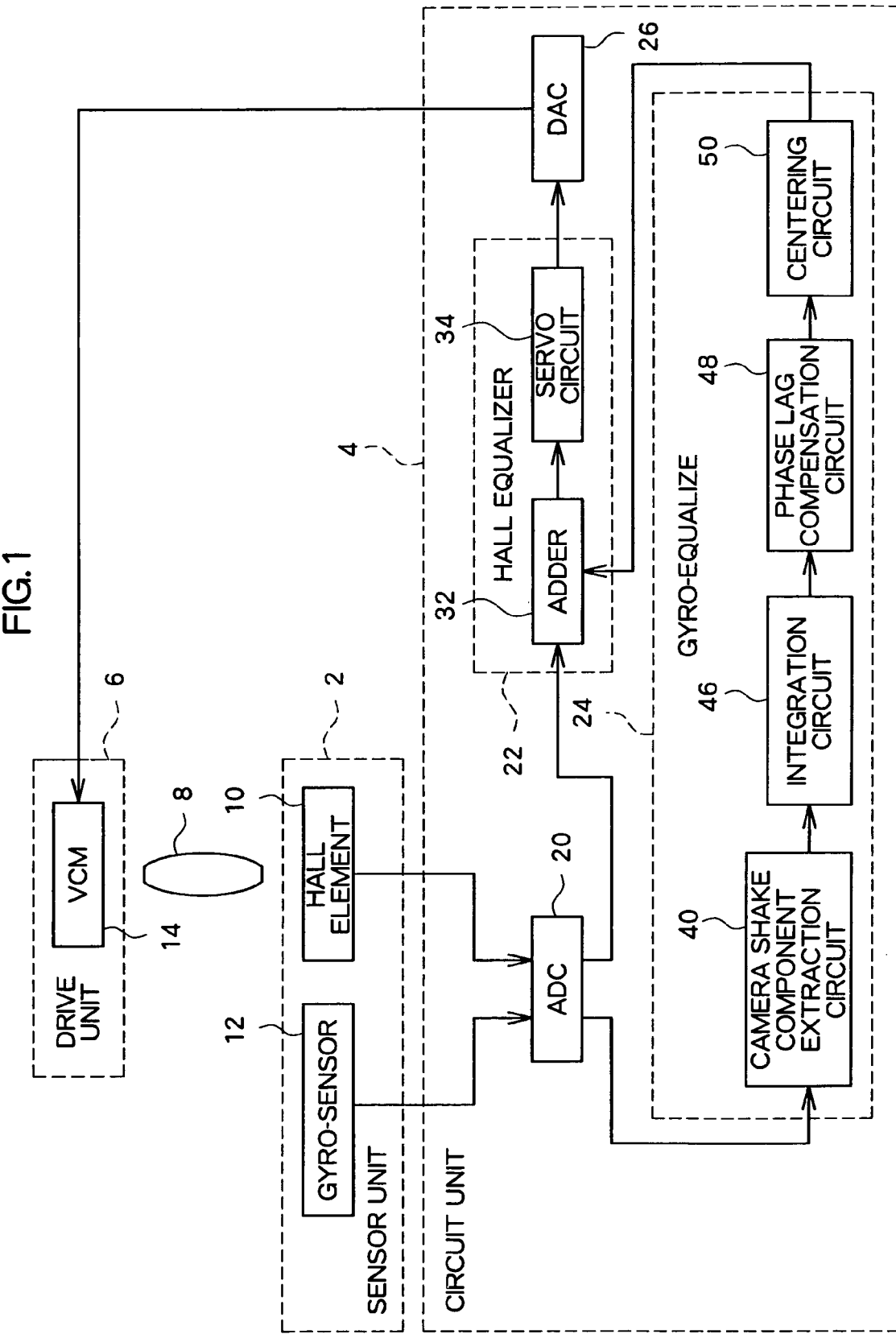

IMAGE STABILIZATION CONTROL CIRCUIT

CROSS-REFERENCE TO RELATED APPLICATION

The priority application number JP 2007-331837 upon which this patent application is based is hereby incorporated by reference.

BACKGROUND OF THE INVENTION

1. Field of the Invention

The present invention relates to an image stabilization control circuit for driving an image stabilization mechanism provided in order to compensate for camera shake or other vibration in an image-capturing device such as a digital still camera.

2. Description of the Prior Art(s)

Contemporary image-capturing devices are often provided with camera shake correction functions in order to suppress a decline in picture quality due to camera shake. Many types of camera shake correction methods exist. In one of the methods, vibration in the image-capturing device is detected by a vibration-detection element, and an optical component such as a correction lens, or an imaging element such as a CCD image sensor is displaced by an actuator on the basis of the detected signal. The vibration-detection element employs a gyro-sensor and detects angular velocity that corresponds to the change in the direction of the optical axis. The displacement magnitude of the lens or the like is used to controllably drive the actuator. Therefore, the image stabilization control circuit for generating the driving signal of the actuator performs a process in which the angular velocity or other type of displacement velocity obtained from the vibration-detection element is integrated and converted to the displacement magnitude.

More particularly, the process for obtaining the displacement magnitude subjects the angular velocity signal outputted from the gyro-sensor to a camera shake component extraction process to remove a frequency component below the region of camera shake vibration frequencies, and converts the angular velocity into an angle-dependent displacement magnitude by integration. In the process for obtaining the displacement magnitude, by damping the output signal of the integration process or by other means, a centering process is also performed to establish the displacement magnitude so that it is made more difficult for the lens or the like to reach the movability limit. As used herein, the phrase "a processor for generating the vibration-compensating signal that corresponds to the displacement magnitude on the basis of the output signal of the gyro-sensor" is referred to as a gyro-equalizer.

Heretofore, gyro-equalizers have been implemented by software for which a microprocessor is used. In this case, a high processing rate is required for the image stabilization control circuit, and the microprocessor must be able to operate with a high speed clock. For instance, in the event that an imaging device is capturing 30 image frames per second to obtain moving images, it is necessary for the lens position to follow a vibration with a speed greater than $1/30^{th}$ of a second.

Power consumption increases in the image stabilization control circuit in the event that a microprocessor is driven using a high speed clock. An image-capturing device carrying a image stabilization control circuit is driven by a secondary battery such as a lithium battery as a power source. Therefore, as the power consumption of the image stabilization control circuit is increased, the secondary battery depletes more rapidly, and the drive time of the image-capturing device is reduced. In other words, a problem arises in which the time for capturing moving pictures is reduced, and the number of capturing still images decreases. Because the camera shake correction function in an image-capturing device often operates not only when capturing moving pictures or still images but also during preview mode when an image is being prepared, consumption of power by the camera shake correction function should preferably be reduced.

In this case, by implementing a gyro-equalizer with a filter circuit, the microprocessor can be dispensed with and power consumption can be reduced. More specifically, a camera shake component extraction process can be configured using a high frequency pass filter (high pass filter, or HPF). It is possible to perform an integration process by using a low frequency pass filter (low pass filter, or LPF). It is also possible to perform a centering process by using an HPF and removing the direct-current component of the integration process output signal.

In the event that the gyro-equalizer comprises these filter circuits, it is desirable that the phase characteristic of the gyro-equalizer be 90° delayed from the input signal of the gyro-equalizer at least in the target compensation region $B_{CMP}$ for vibration compensation. In other words, the accuracy decreases as the phase delay (phase lag) is shifted from 90°, and vibration will be less accurately compensated.

An LPF performing an integration process, for example, has a phase characteristic such that there is a delay of 90° in a frequency range higher than a transition region in which a cutoff frequency $f_c$ is located and 0° in a frequency range lower than the transition region. A centering HPF has a phase characteristic such that there is a shift of 0° in a frequency range higher than the transition region and an advance of 90° in a frequency range lower than the transition region. Hence, in a gyro-equalizer using a filter circuit, the magnitude of the phase delay in the low frequency range falls below 90°. The decline of the magnitude of the phase delay can reach the region of the low frequency range within the target compensation region for such reasons as mentioned above; i.e., the phase characteristics of the LPF and HPF have a transition region in the vicinity of the cutoff frequency $f_c$, and the lower limit of the target compensation region is set to a low frequency of, e.g., several Hz. FIG. 4 shows phase characteristics of a gyro-equalizer schematically illustrating such circumstances, the horizontal axis corresponding to a frequency f, and the vertical axis corresponding to a phase φ of an output signal corresponding to an input signal. In FIG. 4, a frequency $f_L$ is the lower limit of the target compensation region $B_{CMP}$, and a frequency $f_H$ is the upper limit.

An angular velocity component fluctuating at a frequency lower than the lower limit $f_L$ will be removed by an HPF provided to the input of the gyro-equalizer; therefore, the effect on the accuracy of the displacement magnitude required in the gyro-equalizer caused by the fact that the phase delay is less than 90° in a frequency region below $f_L$ can be limited. By contrast, the fact that the phase characteristic in the target compensation region $B_{CMP}$ deviates from a 90° phase delay presents a problem in regard to a stronger effect of reducing the accuracy of the vibration-compensating signal corresponding to the displacement magnitude, and adequate vibration compensation cannot be realized.

SUMMARY OF THE INVENTION

The present invention was perfected in order to resolve the aforementioned problems, and provides an image stabilization control circuit capable of minimizing any decline in accuracy of a vibration-compensating signal generated from a vibration detection signal corresponding to a displacement velocity, suitably compensating for the vibration.

The image stabilization control circuit according to the present invention is a circuit in which a vibration detection signal corresponding to a displacement velocity is obtained from a vibration-detection element of an image-capturing device, and which drives an image stabilization mechanism of the image-capturing device, the circuit having a vibration-compensating signal generator circuit for performing an integration process on the vibration detection signal and generating a vibration-compensating signal corresponding to the displacement magnitude of the image-capturing device; and a servo circuit for generating, on the basis of the vibration-compensating signal, a drive signal for driving the image stabilization mechanism. The vibration-compensating signal generator circuit has a high pass filter for damping a low-frequency component from the vibration detection signal and transmitting a vibration component in a target compensation region; an integration circuit for performing the integration process on the vibration detection signal that has passed through the high pass filter; and a phase lag compensation circuit for performing phase lag compensation, and adjusting a phase characteristic of the vibration-compensating signal generator circuit in the target compensation region.

BRIEF DESCRIPTION OF THE DRAWINGS

FIG. 1 is a schematic block diagram of an image stabilizing system according to an embodiment of the present invention;

DESCRIPTION OF THE PREFERRED EMBODIMENT(S)

Figure 2A:
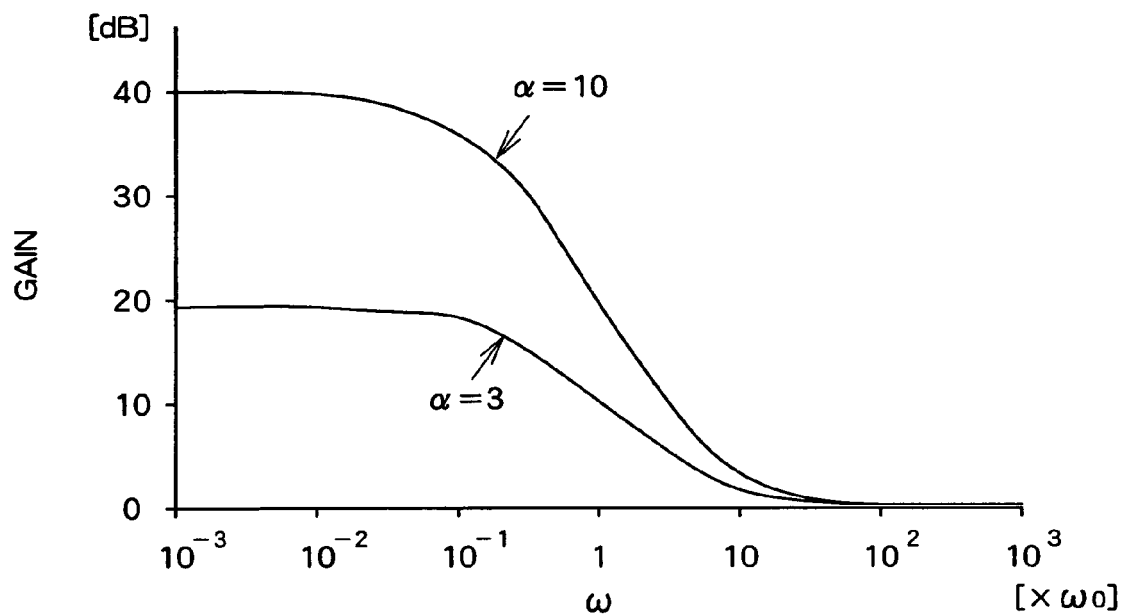
FIGS. 2A and 2B are schematic Bode diagrams of ordinary phase lag compensation elements.

Several embodiments of the present invention will be described hereinafter with reference to the accompanying drawings. The present embodiments relate to a camera, and the image stabilization control circuit according to the present invention is used in the camera shake correction function of the camera.

FIG. 1 is a schematic block diagram showing an image stabilizing system according to an embodiment. The image stabilizing system has a sensor unit 2, a circuit unit 4, and a drive unit 6. Several schemes can be used for the image stabilizing system. For example, the present system can operate according to a scheme for controlling the location of a corrective lens (lens 8) provided to an optical system for forming an optical image on a receiving surface of an image pickup element (not shown).

The sensor unit 2 is composed of a Hall element 10 and a gyro-sensor 12. The Hall element 10 is a sensor provided in order to detect a displacement of the lens 8, and the element generates a voltage signal $V_P$ corresponding to the distance to the lens 8 on the basis of the magnetic field of a magnet fixed to the lens 8, and outputs the signal to the circuit unit 4. In order to detect the two-dimensional position ($P_X$, $P_Y$) of the lens 8 within a plane (x-y plane) perpendicular to the optical axis, the Hall element 10 is provided in correspondence with both the x-direction and the y-direction, and the signal $V_P$ can be obtained in each of the x-direction and the y-direction.

The gyro-sensor 12 is a sensor (vibration-detection element) provided in order to detect vibration of a camera, and the sensor presents the circuit unit 4 with a voltage signal $V_\omega$ corresponding to an angular velocity $\omega$ as a vibration detection signal corresponding to the displacement velocity of the camera. Two gyro-sensors 12 are also provided, and these sensors can provide the signal $V_\omega$ both for the angular velocity component around the x-axis and for the angular velocity component around the y-axis.

The displaceable lens 8 and the drive unit 6 for displacing the lens 8 constitute an image stabilization mechanism, and the drive power source of the drive unit 6 is composed of, for example, a voice coil motor (VCM) 14. The VCM 14 linearly displaces the VCM-constituting moveable coil and controls the position of the lens 8 in accordance with the voltage of the drive signal generated by the circuit unit 4. In order to implement two-dimensional displacement within the x-y plane, a pair of VCMs 14 is provided, allowing displacement to be made both in the x-direction and in the y-direction.

The circuit unit 4 has an A/D converter (ADC; analog-to-digital converter) 20, a Hall equalizer 22, a gyro-equalizer 24, and a D/A converter (DAC; digital-to-analog converter) 26. The circuit unit 4 is composed of logic circuits, and is formed as, for example, an ASIC (application specific integrated circuit).

The output signals of the Hall element 10 and gyro-sensor 12 are inputted to the ADC 20. The ADC 20 converts the voltage signals $V_P$ outputted by the two Hall elements 10 and the voltage signals $V_\omega$ outputted by the two gyro-sensors 12 into digital data on a time-sharing basis. Each of the signals is periodically converted from analog to digital for each servo control cycle.

Position data $D_P$ generated based on the output of the Hall elements 10 is inputted to the Hall equalizer 22. Angular velocity data $D_\omega$ generated based on the output of the gyro-sensor 12 is inputted to the gyro-equalizer 24.

The gyro-equalizer 24 is a circuit for generating a vibration-compensating signal corresponding to the camera displacement. The equalizer integrates the angular velocity $D_\omega$ inputted over a prescribed sampling period in each servo control cycle, and generates data $D_\theta$ corresponding to a vibration angle $\theta$ of the camera around the x-axis and y-axis. The gyro-equalizer 24 generates and outputs vibration-compensating data $D_S$ corresponding to the camera shake magnitude in both the x-direction and the y-direction on the basis of the data $D_\theta$. The composition of the gyro-equalizer 24 will be further described below.

The Hall equalizer 22 has an adder 32 and a servo circuit 34. The adder 32 adds positional data $D_P$ inputted from the ADC 20 and vibration-compensating data $D_S$ from the gyro-equalizer 24 separately in the x and y-directions. The servo circuit 34 calculates servo data $D_{SV}$ that corresponds to the required displacement magnitude of the lens 8 from the output data of the adder 32 both in the x-axis direction and in the y-axis direction.

The DAC 26 converts the servo data $D_{SV}$ outputted from the Hall equalizer 22 into an analog voltage signal. The voltage signal outputted by the DAC 26 is subjected to a predetermined amplification process and is applied to the VCM 14. The VCM 14 is driven in the direction in which the absolute value of $D_{SV}$ decreases, the lens 8 in a camera provided with the present system is thereby moved in accordance with the camera shake in the image capture interval, the shake-induced displacement of the subject image on the image element can be compensated, and a high-quality image signal can be obtained.

A description of the structure of the gyro-equalizer 24 will now be provided. The gyro-equalizer 24 has a camera shake component extraction circuit 40, an integration circuit 46, a phase lag compensation circuit 48, and a centering circuit 50.

The camera shake component extraction circuit 40 is an HPF, and the circuit is presented with an angular velocity signal composed of temporally sequenced angular velocity data $D_\omega$ from the ADC 20, damps the direct-current component contained in the angular velocity signal, and extracts the high-frequency component of the angular velocity signal reflected by the vibration of the camera. The camera shake component extraction circuit 40 is composed of a digital filter.

The integration circuit 46 integrates the angular velocity signal outputted by the camera shake component extraction circuit 40, and generates an angular signal for expressing the displacement magnitude of the image-capturing device. The integration circuit 46 is configured using an LPF. The LPF is composed of a digital filter, and the filter characteristics are set by a filter coefficient set in a register (not shown). In essence, the phase characteristics of the LPF constituting the integration circuit 46 are preferably set so that a phase delay of 90° with respect to the inputted angular velocity signal can be realized in the target compensation region $B_{CMP}$ for correcting camera shake.

The angular signal obtained from the integration circuit 46 is inputted into the centering circuit 50 via the phase lag compensation circuit 48. The centering circuit 50 performs a process for correcting the displacement magnitude so that the lens 8 will not readily attain the movability limit according to an image stabilization mechanism. One centering technique is a method for damping a component considered to be direct current and having a frequency lower than the lower limit $f_L$ of the target compensation region $B_{CMP}$, from the angular velocity signal obtained by integration. In this case, the centering circuit 50 can be configured using an HPF. The HPF is composed of a digital filter, and the filter characteristics are set depending on a filter coefficient set in a register (not shown). In essence, the cutoff frequency $f_C$ of the HPF constituting the centering circuit 50 is set below the lower limit $f_L$ of the target compensation region $B_{CMP}$. In addition, the phase characteristics are preferably set so that the phase advance (phase lead) of the HPF generated in the low-frequency region does not encroach into the region $B_{CMP}$.

Figure 4:
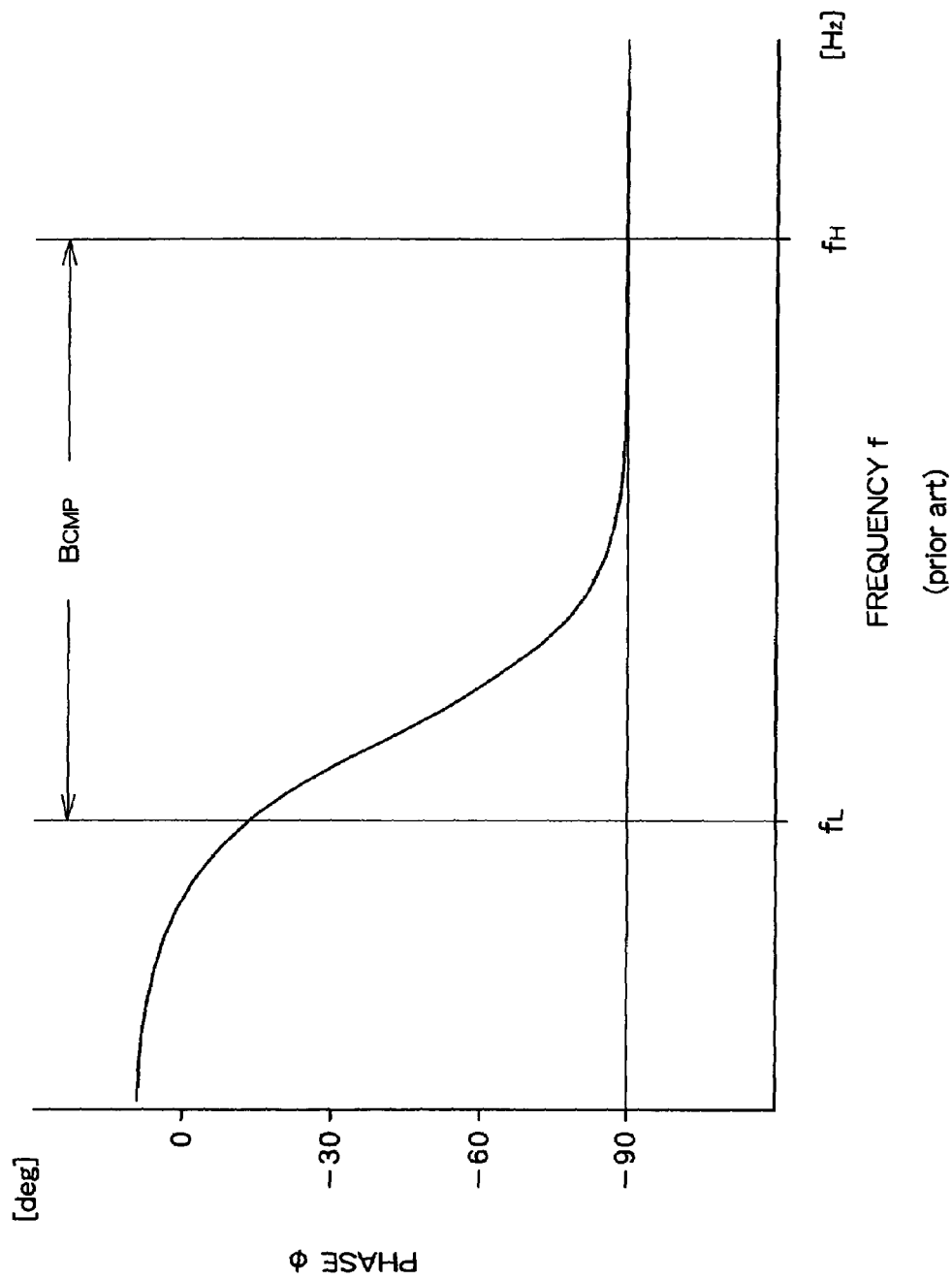
FIG. 4 shows phase characteristics of a gyro-equalizer schematically showing problems with the prior art.

The frequency characteristic of the integration circuit 46 and the centering circuit 50 is taken into account so that the vibration-control signal outputted from the gyro-equalizer 24 will be a signal corresponding to a suitable integration result of the angular velocity in the target compensation region $B_{CMP}$. However, this is not readily accomplished, and problems similar to those of the prior art described using FIG. 4 may arise. In the present invention, the gyro-equalizer 24 is provided with a phase lag compensation circuit 48 to address this problem. The phase lag compensation circuit 48 can be composed of a digital filter.

Figure 2B:
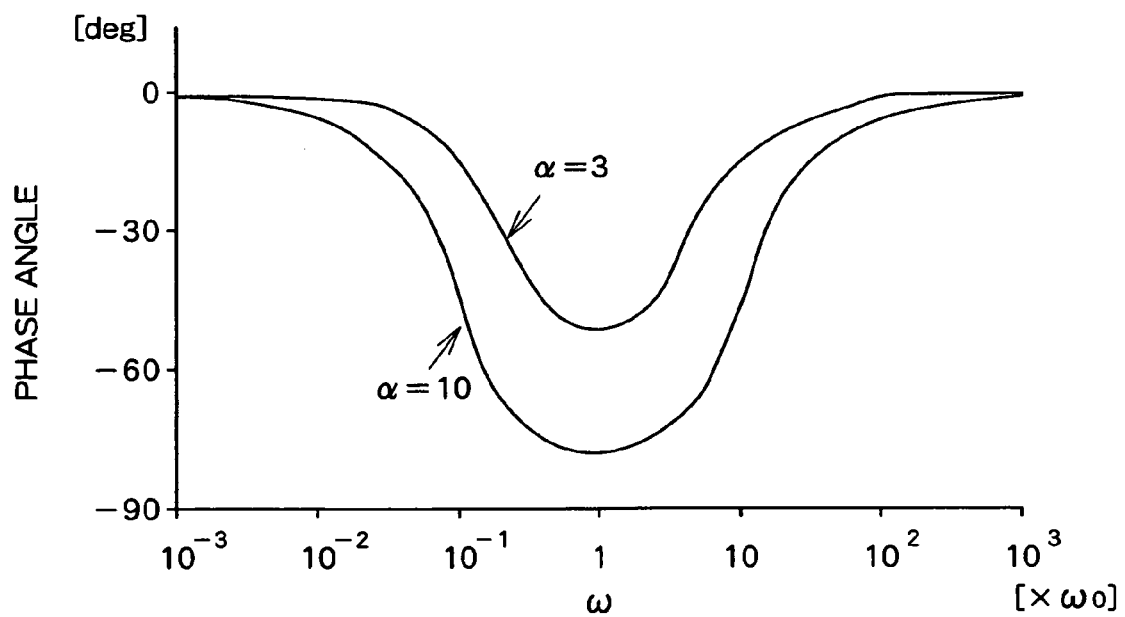

The phase lag compensation circuit 48 provides a phase delay in a particular frequency region to the integration signal inputted from the integration circuit 46, and sends an output to the centering circuit 50. FIGS. 2A and 2B are schematic Bode diagrams of a typical phase lag compensation element. FIG. 2A shows a gain characteristic, and FIG. 2B shows a phase characteristic. Such a phase lag compensation element may, for example, be provided with the bilinear transfer function G(s) below.

$$G(s)=K(s+\alpha\omega_0)/\{s+(1/\alpha)\omega_0\}$$

In the formula, s is a Laplace operator. K, $\alpha$, and $\omega_0$ are parameters, where $\omega_0>0$ and $\alpha>1$. In the simple case that K=1, the gain characteristic of a phase lag compensation element provided with this transfer function is equal to $\alpha$ (20 $\log_{10}\alpha$ [dB]) when the angular frequency of the input signal is $\omega_S=\omega_0$, asymptotically approaches $\alpha^2$ (40 $\log_{10}\alpha$ [dB]) on the low-frequency side, and asymptotically approaches 1 (0 [dB]) on the high-frequency side. The phase is defined as the maximum phase delay angle $\phi_M$ when $\omega_S=\omega_0$, and asymptotically approaches 0 as $\omega_S$ moves away from $\omega_0$ toward lower frequencies or higher frequencies. $\phi_M$ is given by the following formula and has an absolute value of 90° or less. An increase in $\alpha$ is accompanied by an increase in the absolute value of $\phi_M$ and causes the effect of the phase lag compensation to reach a wider frequency region.

$$\phi_M=\tan^{-1}\{(1/\alpha-\alpha)/2\}$$

A filter having the phase lag compensation characteristic shown in FIG. 2A or 2B is referred to as a low-boost filter (LBF). The filter is also referred to as a low-shelf filter (low-shelving filter) because of the shape of the gain characteristic, which results from a shelf-form gain being applied to the low band.

The phase lag compensation circuit 48 is configured using an LBF. The phase lag compensation range and degree are set so that a decrease in the phase delay to under 90°; i.e., an insufficient phase delay, on the low-frequency side of the target compensation region $B_{CMP}$ shown in FIG. 4 can be compensated for by adjusting $\omega_0$ and $\alpha$. In the event that compensation is made for any insufficient phase delay in the low-frequency range of the target compensation region $B_{CMP}$, the frequency $\omega_0$ at which the largest phase delay is generated is set to the lower-frequency side of the center of the target compensation region $B_{CMP}$ on a decibel scale. It will accordingly be possible for phase lag compensation performed by the phase lag compensation circuit 48 on the low-frequency side of the target compensation region $B_{CMP}$ (for example, lower limit $f_L$) to have a magnitude surpassing that on the high-frequency side (for example, upper limit $f_H$).

Figure 3:
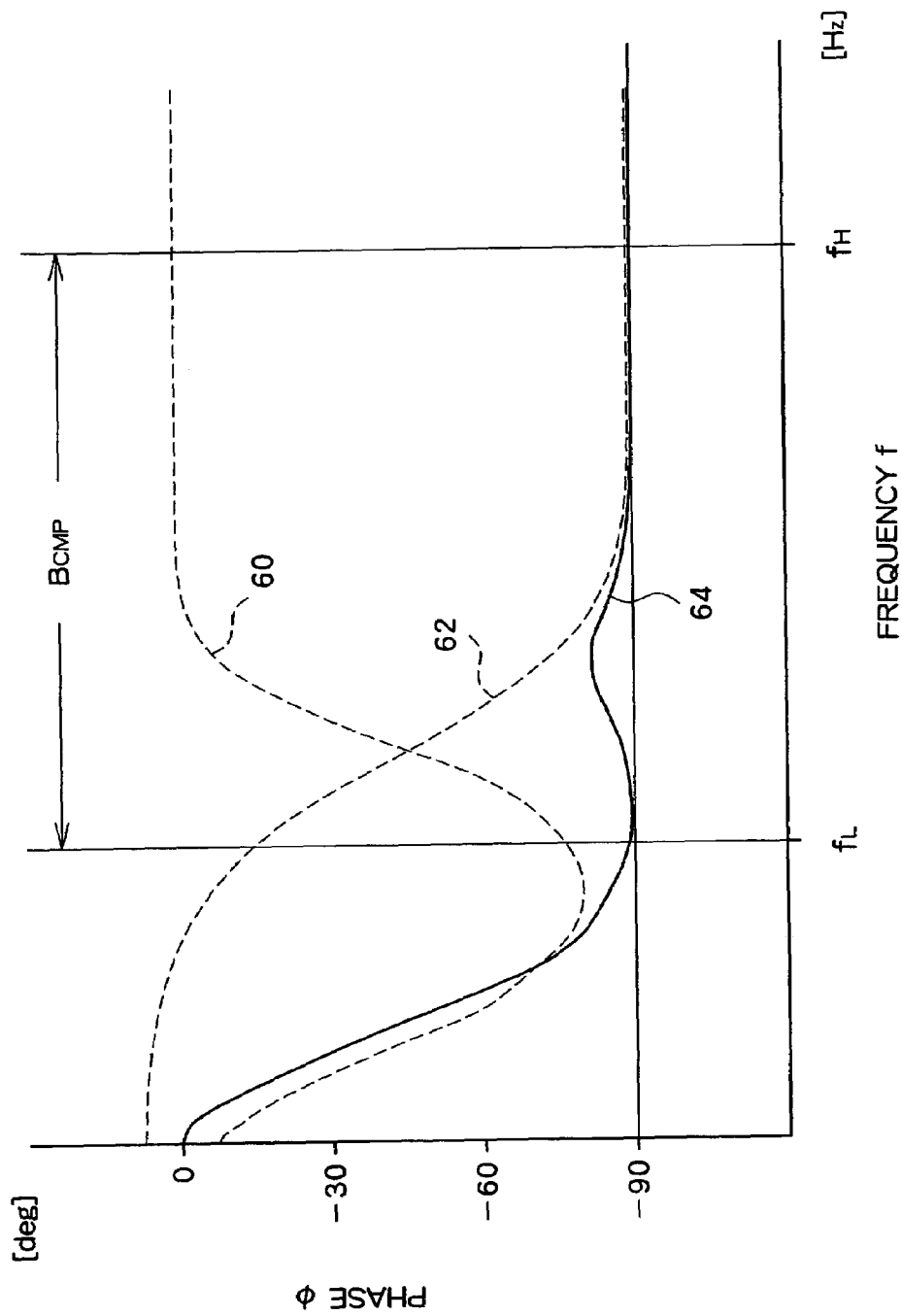
FIG. 3 is a graph schematically showing the phase characteristics of a gyro-equalizer provided with a phase lag compensation circuit.

FIG. 3 is a graph schematically showing the phase characteristics of the gyro-equalizer 24 provided with the phase lag compensation circuit 48. FIG. 3 shows the phase characteristic of the integration circuit 46 and the centering circuit 50 (phase curve 60), the phase characteristic of the phase lag compensation circuit 48 (phase curve 62) set corresponding to phase curve 60, and the phase characteristic of the gyro-equalizer 24 provided with the phase lag compensation circuit 48 (phase curve 64). As shown in FIG. 3, providing a phase lag compensation circuit 48 makes it possible to selectively compensate for phase delay in the frequency range where there is an insufficient phase delay, and bring the phase characteristic of the gyro-equalizer 24 closer to a 90° delay across the entirety of the target compensation region $B_{CMP}$. The gyro-equalizer 24 is thereby able to perform a suitable integration process in the target compensation region $B_{CMP}$, and generate a compensation-control signal corresponding to the angle $\theta$ at which the angular velocity $\omega$ is integrated.

In a case that a region of insufficient phase delay remains in the target compensation region $B_{CMP}$ as result of using only one LBF, additional LBFs may be added so that selective phase lag compensation can be performed for the region.

The element selectively generating a phase delay in a given frequency range as in FIG. 2B essentially serves as a low-shelf filter for generating a gain transition in the frequency range, as can be understood from Bode's theorem. The low-shelf filter has a bi-quadratic transfer function as well as the above-mentioned bi-linear function. The phase lag compensation circuit 48 can comprise a digital filter having a transfer function other than the above bi-linear transfer function.

In the above embodiment, the phase lag compensation circuit 48 is arranged between the integration circuit 46 and the centering circuit 50, but may also be provided at any position in the gyro-equalizer 24 downstream of the camera-shake extraction circuit 40. For example, the circuit could be arranged upstream of the integration circuit 46 or downstream of the centering circuit 50.

An arrangement is adopted in the gyro-equalizer 24 so that a process for generating a compensation control signal from an angular velocity signal is performed by a digital filter. This allows the microprocessor or the like used to generate the compensation control signal to be obviated, and power consumption in the circuit unit 4 to be reduced. Furthermore, an arrangement in which the processing of the gyro-equalizer 24 is performed by a digital filter makes it possible to reduce the circuit surface area to a greater degree than with an arrangement having a microprocessor or the like. This makes it possible to reduce the cost of the semiconductor chip on which the circuit unit 4 is formed. Furthermore, the filter coefficient or other adjustment data can be readily changed by having the gyro-equalizer 24 comprise the digital filter. The adjustment data corresponding to the design of the image-capturing device can be thereby readily set.

The embodiment of the present invention is configured such that detection of camera vibration, detection of lens 8 displacement, and driving of the lens 8 are performed by the gyro-sensor 12, the Hall element 10, and the VCM 14, respectively; however, this embodiment is not provided by way of limitation to the present application. For example, the element for driving the lens 8 may be a stepping motor or a piezoelectric element. Vibration detection can be performed by using a sensor for detecting acceleration in a straight line, and detecting vibration of the image-capturing device based on an acceleration signal.

In addition, the embodiment of the present invention is based on a lens shift scheme for driving a lens and correcting the camera shake, but this embodiment is provided by way of limitation to the present application. For example, the present invention can also be applied to an image sensor shift scheme for shifting a CCD image sensor or other image capturing element in accordance with the wobble of the image-capturing device. In this case, the position of the image capturing element is detected by the sensor, and the image capturing element is displaced by an actuator.

According to the present invention as described above, in the event that phase characteristics of a vibration-compensating signal generator circuit generate a phase advance in a particular frequency range in a target compensation region, a phase lag compensation circuit is used to compensate for the degree of phase advance. The displacement velocity in the target compensation region can be thereby accurately converted into displacement magnitude, and the accuracy of the vibration-compensating signal corresponding to the displacement magnitude of the image-capturing device can be increased. As a result, it is possible to adequately compensate for vibration of the image-capturing device.

What is claimed is:

1. An image stabilization control circuit for obtaining from a vibration-detection element provided to an image capturing device a vibration detection signal that corresponds to displacement velocity, and for driving an image stabilization mechanism of the image capturing device, the image stabilization control circuit comprising:
    a vibration-compensating signal generator circuit for performing an integration process on the vibration detection signal and generating a vibration-compensating signal corresponding to the displacement magnitude of the image capturing device; and
    a servo circuit for generating, on the basis of the vibration-compensating signal, a drive signal for driving the image stabilization mechanism; wherein
    the vibration-compensating signal generator circuit has:
    a high-pass filter for damping a low-frequency component from the vibration detection signal, and transmitting a vibration component in a target compensation region;
    an integration circuit for performing the integration process on the vibration detection signal that has passed through the high-pass filter; and
    a phase lag compensation circuit for performing phase lag compensation, and configured to adjust a phase characteristic of the vibration-compensating signal generator circuit closer to a 90° delay across an entirety of the target compensation region.

2. The image stabilization control circuit of claim 1, wherein:
    the phase lag compensation circuit is a low-boost filter in which the gain on a lower-frequency side of the target compensation region is greater than on a higher-frequency side.

3. The image stabilization control circuit of claim 1, wherein:
    the servo circuit generates the drive signal on the basis of a signal obtained by adding a signal corresponding to a drive magnitude of the image stabilization mechanism, and the vibration-compensating signal outputted from the vibration-compensating signal generator circuit, the drive magnitude being obtained from a drive magnitude detector provided to the image capturing device.

4. The image stabilization control circuit of claim 1, wherein;
    the vibration-compensating signal generator circuit has a centering high-pass filter for damping a direct-current component from the output signal of the integration circuit.

5. The image stabilization control circuit of claim 1, wherein:
    the high-pass filter, the integration circuit, and the phase lag compensation circuit include a digital filter circuit and a register; and
    the digital filter circuit performs a filter operation process on the basis of a filter coefficient stored in the register.

6. The image stabilization control circuit of claim 4, wherein;
    the high-pass filter, the integration circuit, the phase lag compensation circuit, and the centering high-pass filter include a digital filter circuit and a register; and
    the digital filter circuit performs a filter operation process on the basis of a filter coefficient stored in the register.

* * * * *